United States Patent [19]
Nagai et al.

[11] Patent Number: 5,707,093
[45] Date of Patent: Jan. 13, 1998

[54] SUCTION PAD, ROTATION—STOP AND GUIDE MECHANISM FOR THE SAME

[75] Inventors: Shigekazu Nagai; Shuuzou Sakurai; Junko Ichinohe; Masayoshi Yamamoto, all of Ibaraki-ken, Japan

[73] Assignee: SMC Kabushiki Kaisha, Tokyo, Japan

[21] Appl. No.: 701,740

[22] Filed: Aug. 22, 1996

Related U.S. Application Data

[62] Division of Ser. No. 296,918, Aug. 31, 1994, Pat. No. 5,582,450.

[30] Foreign Application Priority Data

| Aug. 31, 1993 | [JP] | Japan | 5-216631 |
| Nov. 9, 1993 | [JP] | Japan | 5-279635 |
| Dec. 28, 1993 | [JP] | Japan | 5-337927 |

[51] Int. Cl.⁶ .................................................. B66C 1/02
[52] U.S. Cl. ........................................ 294/64.1; 29/743
[58] Field of Search ............................ 294/2, 64.1, 64.2, 294/64.3, 65; 901/40; 29/743; 414/737, 752; 384/43, 49

[56] References Cited

U.S. PATENT DOCUMENTS

| 2,128,200 | 8/1938 | Allen . | |
| 3,033,604 | 5/1962 | Ammon . | |
| 3,921,971 | 11/1975 | Vollrath . | |
| 4,600,229 | 7/1986 | Oten . | |
| 4,753,004 | 6/1988 | Fujioka | 294/64.1 |
| 4,770,454 | 9/1988 | Muscher et al. . | |
| 5,039,274 | 8/1991 | Bennison | 294/64.1 |
| 5,172,949 | 12/1992 | Nagai et al. . | |
| 5,190,332 | 3/1993 | Nagai et al. . | |
| 5,192,070 | 3/1993 | Nagai et al. . | |

(List continued on next page.)

FOREIGN PATENT DOCUMENTS

| 0 520 910 | 12/1992 | European Pat. Off. . |
| 41 29 289 | 3/1992 | Germany . |
| 41 30 107 | 5/1992 | Germany . |
| 90 18052 | 5/1994 | Germany . |
| 33-2867 | 2/1958 | Japan . |
| 57-184388 | 11/1982 | Japan . |
| 58-81293 | 5/1983 | Japan . |
| 4-28985 | 3/1992 | Japan . |
| 4-82685 | 3/1992 | Japan . |
| 4-63377 | 5/1992 | Japan . |
| 4-63378 | 5/1992 | Japan . |
| 4-63379 | 5/1992 | Japan . |
| 967 058 | 8/1964 | United Kingdom . |
| 1 292 557 | 10/1972 | United Kingdom . |
| 2 134 603 | 8/1984 | United Kingdom . |
| 2 249 079 | 4/1992 | United Kingdom . |
| 2 250 262 | 6/1992 | United Kingdom . |

OTHER PUBLICATIONS

Patent Abstracts of Japan, vol. 14, No. 194, Apr. 20, 1990, JP-A-2-40998, Feb. 9, 1990.

*Primary Examiner*—Dean Kramer
*Attorney, Agent, or Firm*—Oblon, Spivak, McClelland, Maier & Neustadt, P.C.

[57] ABSTRACT

A suction pad comprises a workpiece attracting section made of a metallic material and brought to contact with a surface of a workpiece; a main body made of a flexible material and integrally coupled to the workpiece attracting section; an adapter made of a metallic material and attached to the main body; and a spring member made of a metallic material with one end thereof connected to the workpiece attracting section and the other end thereof connected to the adapter. A rotation-stop and guide mechanism for a suction pad comprises a spline shaft having splines and coupled to the suction pad, a cylindrical member externally fitted to the spline shaft and displaceable along the spline shaft, and a plurality of balls arranged between the cylindrical member and the spline shaft, the balls forming a rotation-stop in cooperation with the splines that stops the rotation of the cylindrical member against the spline shaft, rolling upon displacement of the cylindrical member along the spline shaft.

5 Claims, 19 Drawing Sheets

U.S. PATENT DOCUMENTS

| | | |
|---|---|---|
| 5,193,776 | 3/1993 | Nagai et al. . |
| 5,211,435 | 5/1993 | Nagai et al. . |
| 5,213,385 | 5/1993 | Nagai et al. . |
| 5,244,282 | 9/1993 | Imai et al. ................................ 384/43 |
| 5,251,946 | 10/1993 | Rossmeisl et al. .................... 294/64.1 |
| 5,280,979 | 1/1994 | Poli et al. . |
| 5,549,340 | 8/1996 | Nagai et al. . |

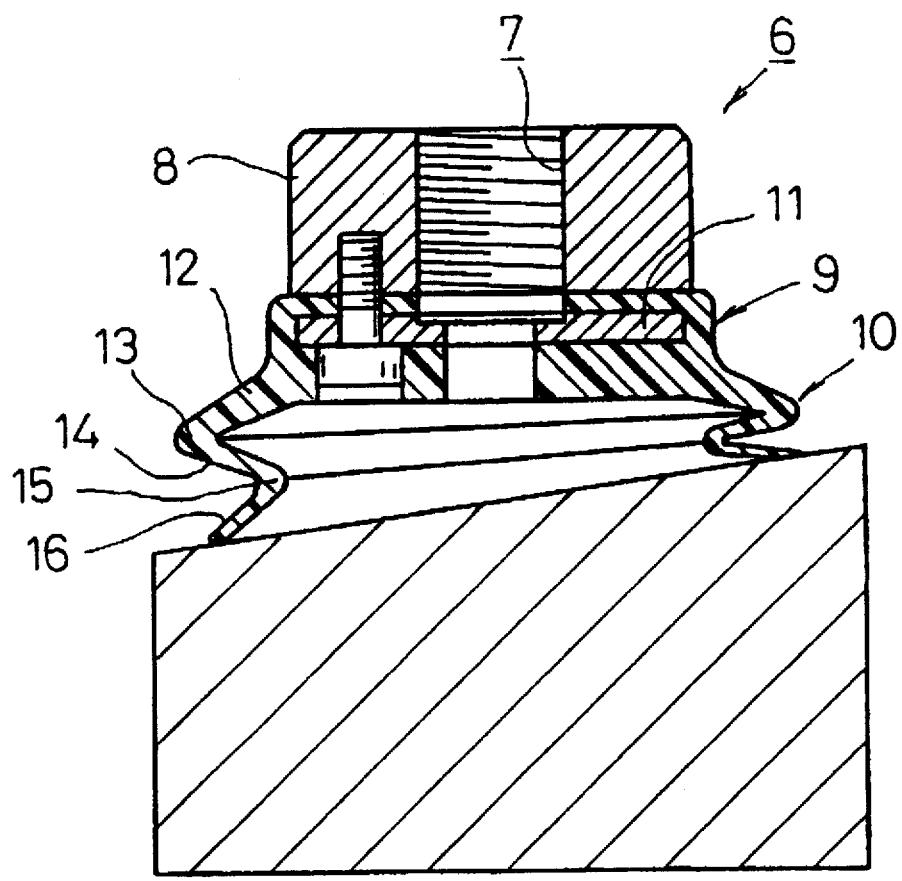

SUCTION PAD, ROTATION— STOP AND GUIDE MECHANISM FOR THE SAME

This is a Division of application Ser. No. 08/296,918 filed on Aug. 31, 1994 now U.S. Pat. No. 5,582,450.

BACKGROUND OF THE INVENTION

1. Field of the Invention

The present invention relates to a suction pad suitable for attracting and conveying electronic components such as semiconductor devices for which it is necessary to avoid generation of static electricity, and to a rotation-stop and guide mechanism for a suction pad, with which the suction pad may be precisely guided to a workpiece to attract it, and while conveying the workpiece, rotation of the suction pad may be stopped to enable highly accurate positioning of the workpiece.

2. Description of the Related Art

A suction pad coupled with a vacuum source has been hitherto employed for conveying workpieces such as semiconductor devices. A suction pad is typically formed of electrically conductive rubber such as conductive NBR, conductive silicone rubber or the like.

A suction pad made of conductive rubber described has an inconvenience that when attracting a semiconductor device or the like, or when releasing it at a desired position, the surface of the semiconductor device subjected to attractive contact with the suction pad tends to bear static electricity due to friction, which possibly impairs the performance of the device.

Thus, a suction pad in which static electricity is prevented from generation on the surface of an attracted semiconductor device is disclosed, for example, in Japanese Patent Laid-open No. 4-82685.

As shown in FIG. 1, the suction pad 1 of the aforementioned laid-open patent has a metallic pad 2 fitted around a suction cup 3 made of conductive nitrile rubber which in turn is fixed to a metallic fixture 4. A gap G is provided between the leading end of the suction cup 3 and the surface of the electronic device 5 to be attracted, not to allow a direct contact therebetween.

With this arrangement, static electricity, that generated by friction between the metallic pad 2 and the device 5, and that borne in advance on the device 5, is discharged through the metallic pad 2, the suction cup 3 of nitrile rubber and the metallic fixture 4. However, the conductive nitrile rubber has a relatively high electrical resistance compared to metal, it is difficult to completely discharge the static electricity from the electronic device 5.

An all metal suction pad, as an alternative for the suction pad 1 shown in FIG. 1 for ease of discharging the static electricity, would suffer attraction failure, since such a suction pad lacks flexibility and makes a solid contact with the surface of the device 5. On the other hand, too fast discharge of the static electricity may damage the electronic device, depending on the type.

In an assembly line, an electronic device such as an IC chip laid in a pallet is attracted and transferred by a suction pad, to have the terminals of the IC chip inserted into predetermined holes of a board placed on the line so as to be electrically connected.

In conveying the IC chip in such a manner, there arises another inconvenience in which the suction pad is rotated due to impact, vibration or other forces transmitted through a robot arm, or twist of a connection tube between a vacuum source and the suction pad produced from the movement of the robot arm. This makes it difficult to effect proper insertion of the IC chip terminals into the board holes, especially in a recent technical situation where high density surface mounting is required with IC chips becoming smaller and smaller. Small terminal distances of IC chips require highly accurate positioning of the IC chips on the board.

To attract and transfer a workpiece having an inclined surface, a suction pad associated with a bellows skirt as shown in FIGS. 2 and 3A has been hitherto employed. The bellows skirt 10 is usually made of electrically conductive rubber. When the skirted suction pad 6 attracts the workpiece 17, the bellows skirt 10 contracts as shown in FIG. 3B, which, after releasing the workpiece 17, normally re-assumes the original bellows shape shown in FIG. 3A.

However, sometimes, the skirt 10 fails to restore the original bellows shape, after releasing the workpiece 17, due to stickiness of the rubber material of the bellows, as shown in FIG. 3C. The restoration failure of the skirt 10 greatly impairs the adaptability of the skirt 10 to workpiece shapes, and the attracting capability of the suction pad 6.

Thus, as shown in FIGS. 4 and 5, a suction pad has been devised in which one outer wall surface of bellows is provided with a plurality of ribs 18a–18f protruding outwardly. The ribs 18a–18f prevent the bellows surfaces from sticking to each other. However, it has been experienced that a suction pad of this type has a tendency of being readily worn out at the outer wall surface of bellows to which the ribs contact repeatedly. Therefore, the problem of restoration failure in the skirted suction pad has not yet been finally solved.

SUMMARY OF THE INVENTION

A general object of the present invention is to provide a suction pad from which static electricity borne by electronic components such as semiconductor devices can be completely removed, and is capable of flexibly attracting, holding and transferring the electronic components.

To achieve the above object, the suction pad according to the present invention lies in a suction pad for attracting, holding and transferring an electronic component such as a semiconductor device, comprising: a workpiece attracting section made of a metallic material and brought to contact with the surface of the electronic component; a main body made of a flexible material and integrally coupled to the workpiece attracting section; an adapter made of a metallic material and attached to the main body; and a resilient member made of a metallic material, with one end thereof connected to the workpiece attracting section and the other end thereof connected to the adapter.

In the suction pad, the resilient member may be a spring or a bellows, and the spring may be arranged in a hole defined in the main body, or arranged outside the main body. In addition, in the suction pad, a rectifier or a variable resistor may be inserted between divisions of the spring, or a rectifier and a variable resistor may be inserted between divisions of the spring.

Another object of the present invention is to provide a suction pad which is capable of positioning a workpiece with a superior accuracy under a stable operation.

Still another object of the present invention is to provide a suction pad which gives less vibration and impact to a workpiece.

In order to achieve the object, a rotation-stop and guiding mechanism for a suction pad according to the present invention comprises: a shaft, coupled at one end thereof to a suction pad and coupled at the other end thereof to a tube for communicating with a vacuum source, having a through hole defined therein for allowing communication between the suction pad and the tube; a cylindrical member externally fitted to the shaft and displaceable along the shaft; raised lines provided on either the outer wall surface of the shaft or the inner wall surface of the cylindrical member, extending along the axis of the shaft, angularly spaced by a predetermined angle; a resilient member interposed between the suction pad and the cylindrical member; and rolling members arranged between the cylindrical member and the shaft, working as a rotation-stop in cooperation with the raised lines to stop the rotation of the cylindrical member against the shaft, rolling upon displacement of the cylindrical member along the shaft.

In the rotation-stop and guide mechanism for a suction pad, the rolling members comprise a plurality of balls, the balls being held between a groove having an approximately semicircular cross-section defined in one of the outer wall surface of the shaft or the inner wall surface of the cylindrical member, and another groove opposing the above-mentioned groove and having a ship-bottom shape cross-section, defined adjacent to the raised line in the other of the outer wall surface of the shaft or the inner wall surface of the cylindrical member. The plurality of balls roll to circulate through an elongated hole communicating with a gap defined by the opposing grooves.

In addition, in the rotation-stop and guide mechanism for a suction pad, an attachment plate may be engaged through a male thread formed on the outer wall surface of the cylindrical member. Flanges defined with bolt holes may be provided at one end of the cylindrical member.

In the suction pad according to the present invention, static electricity, borne by a surface of an electronic component such as a semiconductor device beforehand, and generated by friction between the electronic component and the workpiece attracting section, is discharged to the ground through the metallic workpiece attracting section, the resilient member and the adapter in contact with each other. Therefore, the static electricity charged on the electronic component is completely removed.

In addition, since the main body is of a flexible rubber material, and the workpiece attracting section is disposed swingably owing to the resiliency of the spring, even when the surface of the electronic component 68 has an inclined surface or a curved surface, the main body and the spring cooperate to swing the workpiece attracting section 26 along the inclined surface or the curved surface. Thus, it becomes possible for the suction pad to flexibly attract the electronic component 68 without causing an attraction failure. Further, a rectifier is inserted between divisions of the spring, which prevents the static electricity to be discharged to the ground from flowing back to the electronic component 68. A variable resistor is inserted between divisions of the spring as the resilient member, which controls the rate of discharging the static electricity to the ground, to allow a safe discharge of the static electricity, to guard the performance of the electronic component from being damaged.

In the rotation-stop and guide mechanism for suction pads according to the present invention, when the workpiece is attracted and transferred by the suction pad, the rolling members arranged between the cylindrical member and the shaft are held by the raised lines formed on either the outer wall surface of the shaft member or the inner wall surface of the cylindrical member and form a rotation-stop that stops the rotation of the cylindrical member against the shaft, and roll when the cylindrical member displaces along the shaft. Therefore, rotation of the suction pad is excluded, and sliding resistance between the cylindrical member and the shaft is reduced. The rolling members comprise a plurality of balls, and the plurality of balls roll to circulate through the elongated holes communicating with the gaps defined by the opposing grooves.

Still another object of the present invention is to provide a skirted suction pad in which adhesion of bellows skirt surfaces is prevented from occurring.

In order to achieve the object, the present invention lies in a suction pad for attracting a workpiece, comprising a base which is coupled to a vacuum source, and a skirt formed integrally with said base, wherein; the skirt has first, second and third bellows sections extending from said base to a terminating end provided at the third bellows section; and a plurality of irregularities are provided on the inner wall surface of the first bellows section, both inner and outer wall surfaces of the second bellows section, and the outer wall surface of the third bellows section.

In the suction pad according to the present invention constituted as described above, the workpiece is attracted while the bellows skirt is contracted with the bellows surfaces brought to contact with each other. When the workpiece is released from attraction, the bellows skirt surely restores its original shape, without adhesion of the bellows surfaces to each other, owing to the fine irregularities formed thereon. Therefore, it becomes possible to continuously repeat to transfer the workpiece without interruption.

BRIEF DESCRIPTION OF THE DRAWINGS

Other objects and advantages of the present invention will be easily and clearly understood from preferred embodiments of the present invention which shall be explained hereinafter in detail with reference to attached drawings, wherein:

FIG. 2 is a vertical cross-sectional view showing another conventional suction pad;

DESCRIPTION OF THE PREFERRED EMBODIMENTS

Suction pads and rotation-stop and guide mechanisms for the suction pads according to the present invention will be exemplified by preferred embodiments, and explained hereinafter in detail with reference to the attached drawings.

Figure 7:
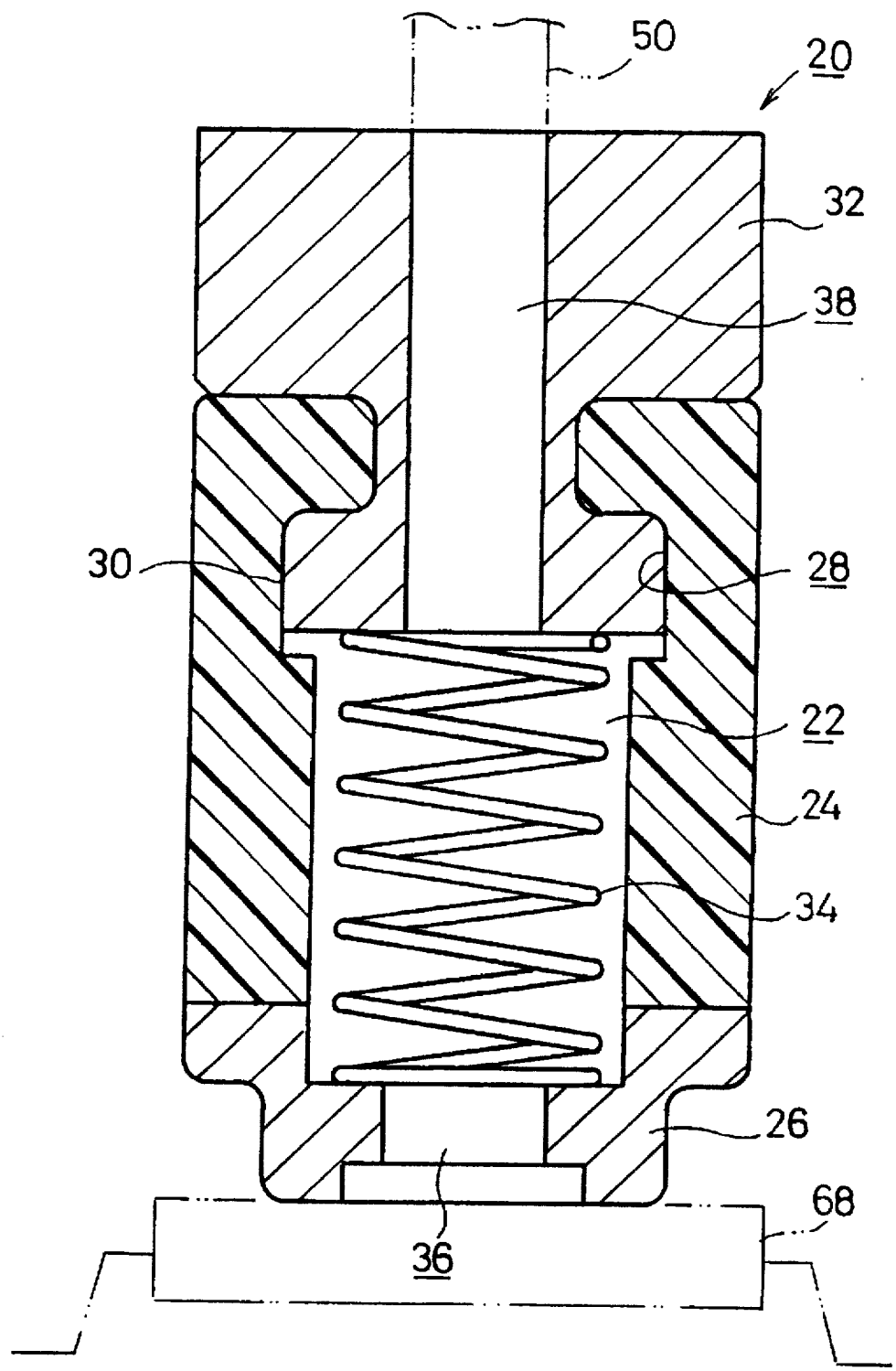
FIG. 7 is a vertical cross-sectional view of the suction pad shown in FIG. 6.

As shown in FIG. 7, this suction pad 20 basically comprises a main body 24 made of a flexible material such as rubber, which has an approximately cylindrical shape with a hole 22 defined therein in an axial direction, a workpiece attracting section 26 made of a metallic material, which is integrally secured to the bottom surface of the main body 24, and an adapter 32 made of a metallic material, which has an annular disk 30 fitted to a recess 28 defined in the hole 22.

The main body 24 which is flexible may be made of any one of synthetic rubber, natural rubber, conductive rubber and the like. The workpiece attracting section 26 is integrally secured to the main body 24, preferably by means of such as vulcanization adhesion.

A metallic coil-spring 34 is resiliently disposed between the workpiece attracting section 26 and the adapter 32 in the hole 22 defined in the main body 24.

The workpiece attracting section 26 and the adapter 32 are formed of a material such as copper, iron and the like. An attracting hole 36, which communicates with the hole 22 of the main body 24, is defined approximately at the center of the workpiece attracting section 26, while a passage 38 of the adapter 32 for communicating with the hole 22 is defined approximately along the central axis of the adapter 32. A female thread (not shown) is formed on the inner wall surface of the passage 38. A leading end of a spline shaft 41 (described below) is screwed into the female thread, so that the passage 38 can communicate with a through hole 50 (described below) of the spline shaft 41.

Next, a rotation-stop and guide mechanism for a suction pad is described with reference to FIG. 6, as follows.

Figure 1:
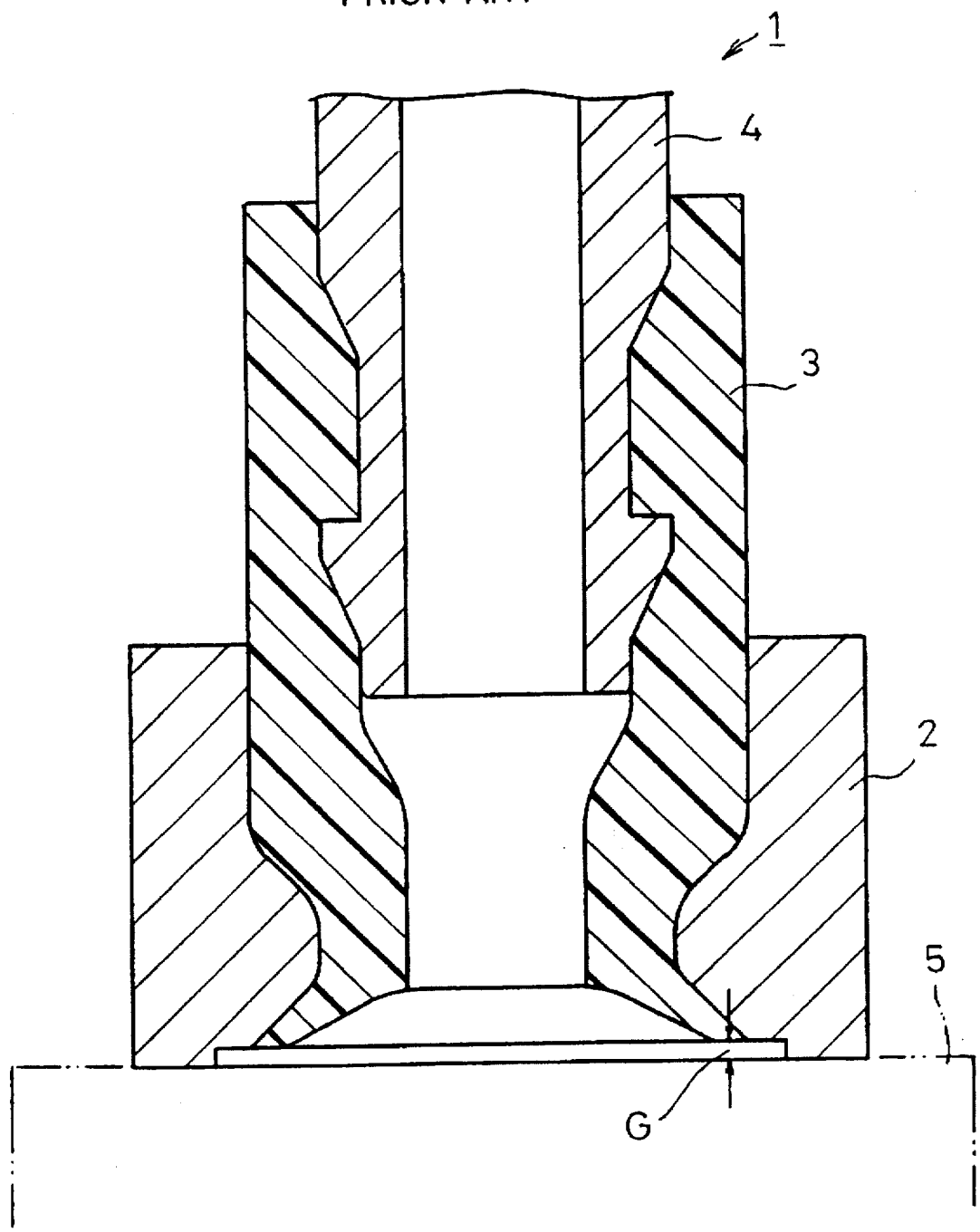
FIG. 1 is a vertical cross-sectional view showing a conventional suction pad.
Figure 3A:
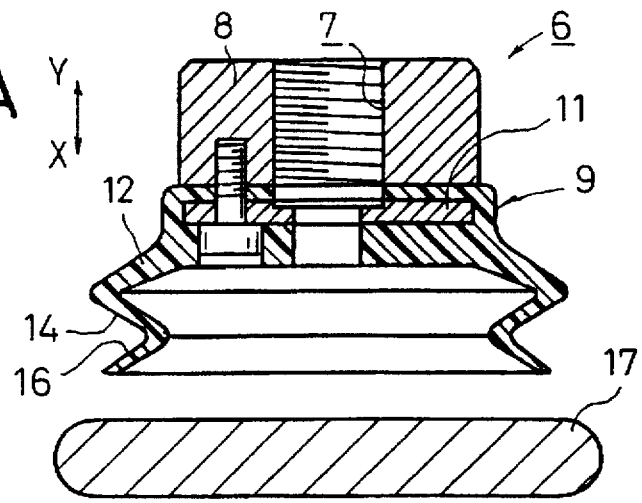
FIGS. 3A–3C are explanatory views for explaining an operation of the suction pad shown in FIG. 2.
Figure 3B:
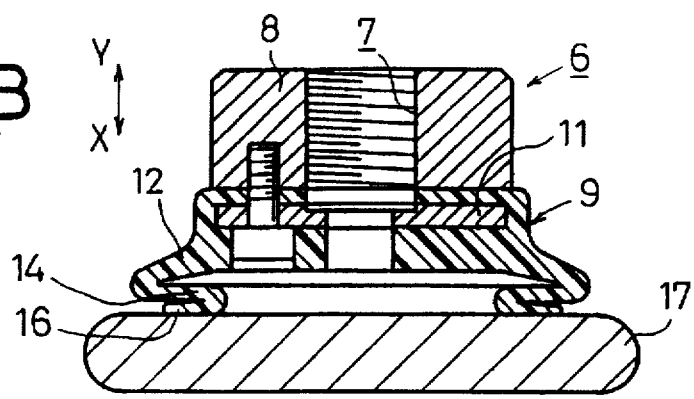
Figure 3C:
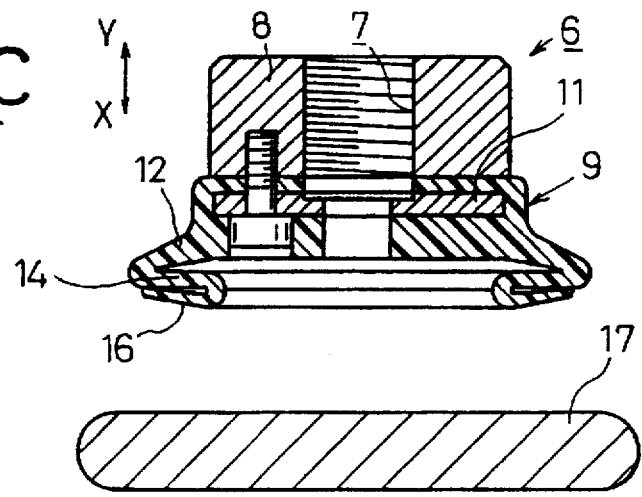
Figure 4:
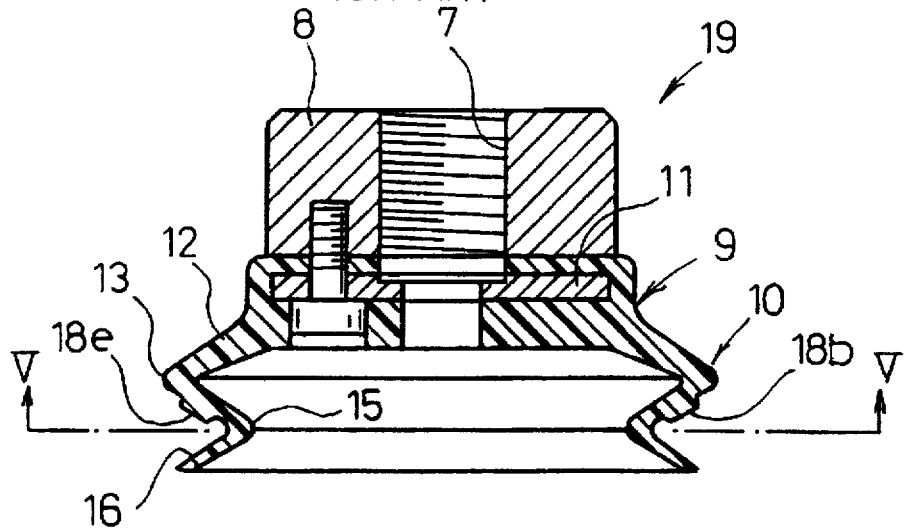
FIG. 4 is a vertical cross-sectional view showing a still another conventional suction pad.
Figure 5:
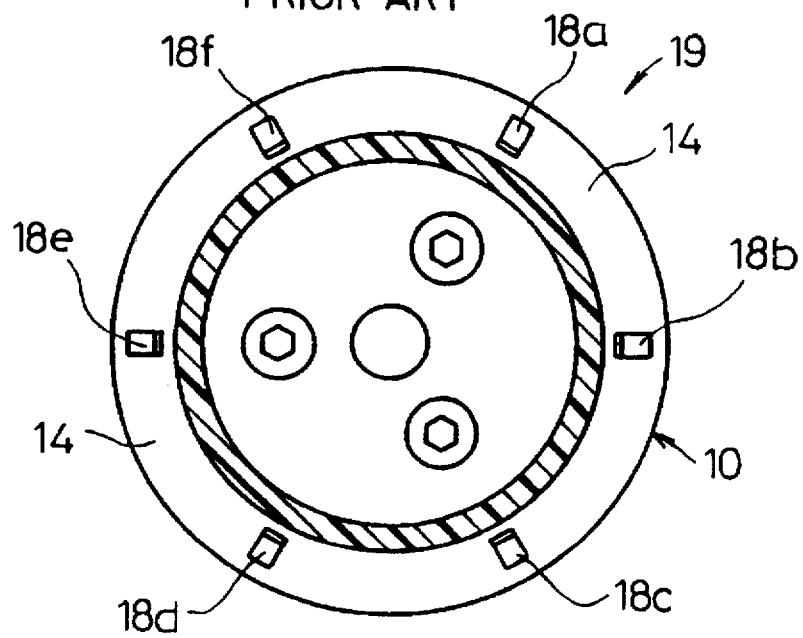
FIG. 5 is a lateral cross-sectional view taken along a line V—V shown in FIG. 4.
Figure 6:
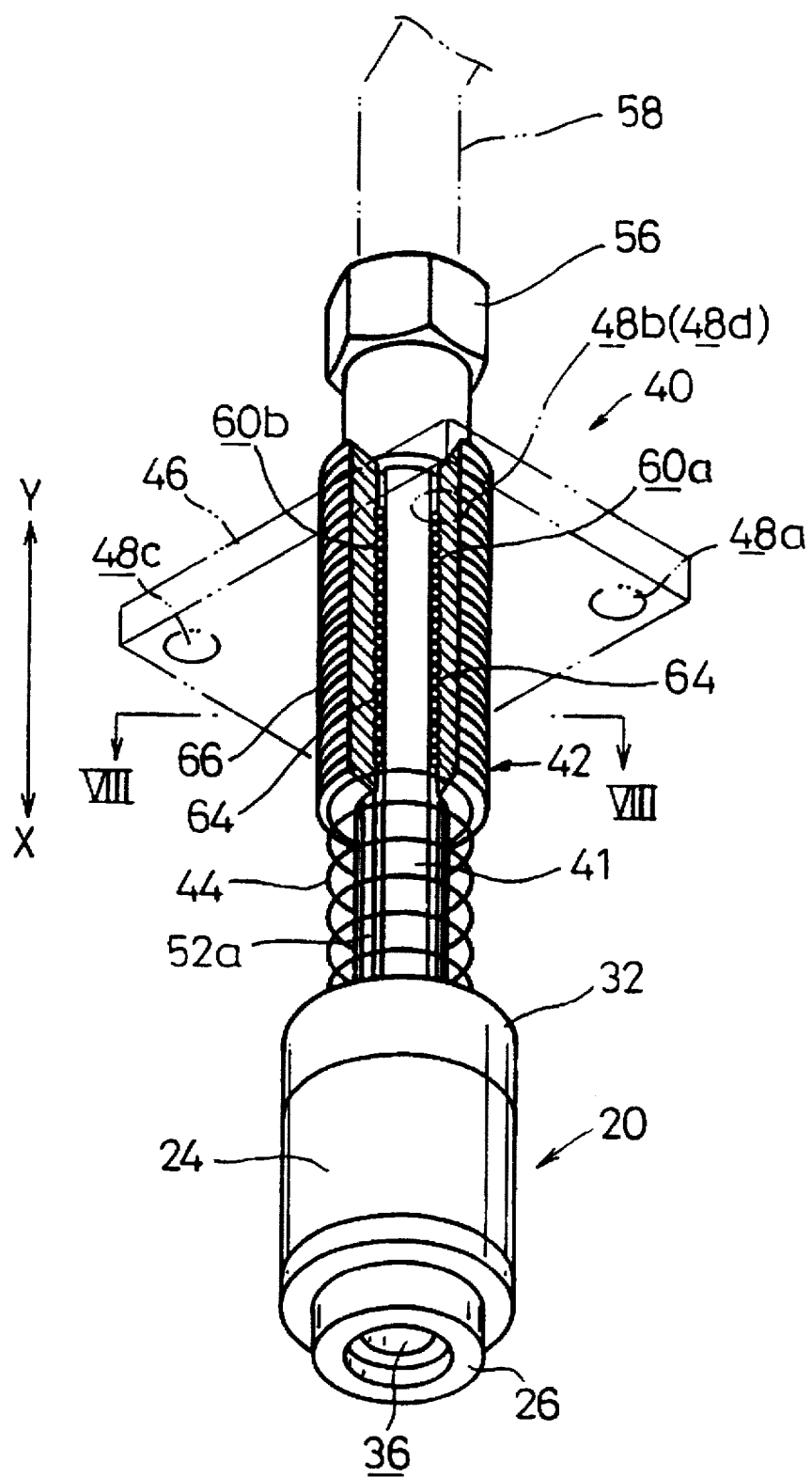
FIG. 6 is a perspective view of a suction pad according to a first embodiment of the present invention, and a rotation-stop and guide mechanism for suction pads.

A rotation-stop and guide mechanism 40 for the suction pad 20 basically comprises a spline shaft 41 (shaft member) which is coupled airtight with the hole 22 by screwed into the passage 38 of the adapter 32 with a seal member (not shown), a cylindrical member 42 externally fitted to and axially displaceable along the spline shaft 41, a spring 44 (resilient member) interposed between the cylindrical member 42 and the suction pad 20 around the spline shaft 41, and an attachment plate 46 which engages with the cylindrical member 42 for adjusting the level of the suction pad 20 with respect to a workpiece (see FIG. 6). The attachment plate 46 has bolt holes 48a–48d at its four corners to bolt itself to a robot arm (not shown).

Figure 8:
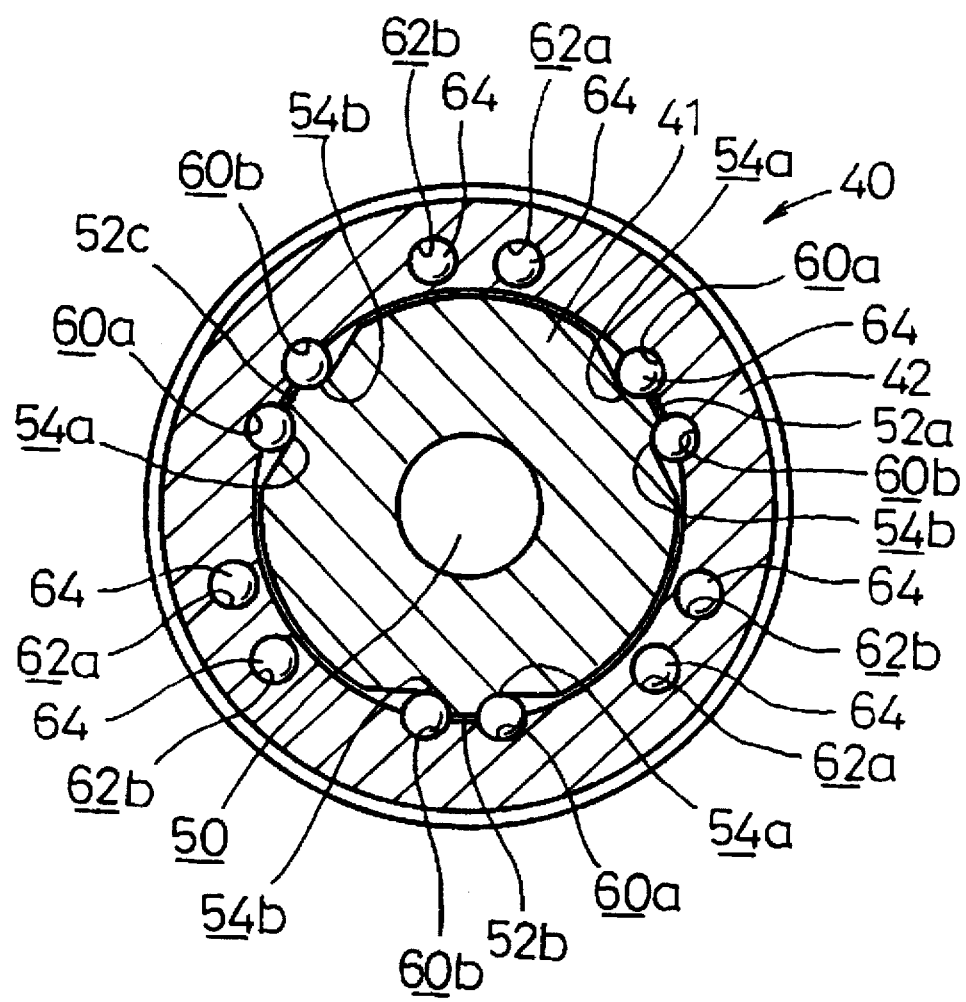
FIG. 8 is a lateral cross-sectional view taken along a line VIII—VIII shown in FIG. 6.

As shown in FIG. 8, a through hole 50 as a fluid passage, is defined in the spline shaft 41 along its axis. Three splines 52a–52c (raised lines) are formed by defining three pairs of grooves 54a, 54b; 54a, 54b; 54a, 54b in the perimeter of the shaft along the longitudinal axis, each pair angularly spaced by a predetermined angle and having respectively a ship-bottom shape cross-section disposed symmetrically across each spline. A tube connector 56 for connecting the spline shaft 41 air-tight with a tube 58 is provided on the end of the spline shaft 41 outside the cylindrical member 42, opposite to the end at which the adapter 32 is attached.

As shown in FIG. 8, three pairs of grooves 60a, 60b; 60a, 60b; 60a, 60b, each having a semicircular cross-section, are defined on the inner wall surface of the cylindrical member 42 along its longitudinal axis, each pair of grooves 60a, 60b respectively opposing each pair of the grooves 54a, 54b on the spline shaft 41. Further, three pairs of elongated holes 62a, 62b; 62a, 62b; 62a, 62b, interposed between the respective pairs of grooves 60a, 60b; 60a, 60b; 60a, 60b, are defined through the thickness of the cylindrical member 42 along its longitudinal axis. Combinations of the grooves and holes, 60a, 62a and 60b, 62b; 60a, 62a and 60b, 62b; 60a, 62a and 60b, 62b form six closed loops with each end of the groove connected with each adjacent end of the hole (see FIG.6). A plurality of balls 64 (rolling members) are arranged and circulate in respective respective closed loops. The arrangement described above constitutes a linearly sliding ball bearing movable along the spline shaft 42. A male thread 66 is formed on the outer surface of the cylindrical member 42, which engages with a female thread (not shown) formed on a hole of the attachment plate 46.

A suction pad 20 and a rotation-stop and guide mechanism 40 therefor according to the first embodiment of the present invention are basically constituted as described above, and the operations thereof will next be explained.

First, the suction pad 20 is coupled to the leading end of the spline shaft 41 which constitutes the rotation-stop and guide mechanism 40 for the suction pad. Here, a male thread (not shown) formed on the leading end of the spline shaft 41 is screwed into the female thread formed on the passage 38 of the adapter 32, and a lock ring (not shown) is fastened, thereby the both are coupled conveniently.

Next, when the suction pad 20 is used in a conveying operation of electronic components such as IC chips, the suction pad 20 is attached to a robot arm via the rotation-stop and guide mechanism 40 and the attachment plate 46 with bolts (not shown) inserted into the bolt holes 48a–48c of the attachment plate 46. By rotating the cylindrical member 42 engaged with the hole of the attachment plate 46, a spacing distance between the suction pad 20 and the IC chip, that is a length in the axial direction, can be adjusted. After the adjustment, the cylindrical member 42 is fixed to the attachment plate 46 with a fixing means (not shown). Thereafter, the tube 58 which communicates with the vacuum source is coupled to the spline shaft 41 with the connector 56.

Then, the vacuum source is driven, an electronic component 68 such as a semiconductor device is attracted by the suction pad 20 through the suction hole 36 of the workpiece attracting section 26 (see FIG. 7), and the robot arm is moved to transfer the electronic component 68 to a desired position.

Static electricity, distributed on the surface of the electronic component 68 beforehand, and generated by friction between the workpiece attracting section 26 and the electronic component 68 is discharged to the ground through the metallic workpiece attracting section 26, the spring member 34 and the adapter 32 respectively which are in contact with each other. Thus, the static electricity borne on the electronic component 68 can be completely removed.

Since the main body 24 is of a flexible rubber material, and the workpiece attracting section 26 is disposed swingably owing to the resiliency of the spring member 34, even when the surface of the electronic component 68 has an inclined surface or a curved surface, the main body 24 and the spring member 34 cooperate to swing the workpiece attracting section 26 along the inclined surface or the curved surface. Thus, it becomes possible for the suction pad 20 to flexibly attract the electronic component 68 without causing an attraction failure.

When the suction pad 20 contacts with and attracts the upper surface of the electronic component 68, the spline shaft 41 displaces in the direction of an arrow Y with respect to the cylindrical member 42 installed on the robot arm against the repulsive force of the spring member 44. In this axial movement, the friction resistance between the cylindrical member 42 and the spline shaft 41 is kept substantially zero by the linearly sliding ball bearing, and abrasion and resulted play in the rotation-stop and guide mechanism 40 can be prevented from occurring. Further, the rotational movement of the suction pad 20 about its longitudinal axis is restricted by the spline shaft 41 which is rotation-stopped with respect to the cylindrical member 42 by means of the linearly sliding ball bearing provided with the splines 52a–52c and the balls 64.

Even when the spline shaft 41 is pulled in a direction perpendicular to its axis by the tube 58 communicating with the vacuum source, for example, since the spline shaft 41 is held by the cylindrical member 42 via the linearly sliding ball bearing, the cylindrical member 42 can move in the direction of the arrow X or Y without being affected at all. The spring member 44 provided between the suction pad 20 and the cylindrical member 42 absorbs a thrust received by the suction pad 20 with its repulsive action, and exhibits a buffering function.

After attracting the electronic component 68 as described above, the arm is moved, and the suction pad 20 is positioned over a circuit board (not shown) placed on a conveyor line. Then, the arm moves in the direction of the arrow X to insert terminals of the electronic component 68 into predetermined holes defined on the circuit board, after which the vacuum in the workpiece attracting section 26 is broken, and the electronic component 68 is released from the suction pad 20. During this movement, since rotation of the spline shaft 41 is excluded, and torsion, impulse, vibration from the tube 58, the robot arm and the like are prevented from transmitted to the spline shaft 41, the terminals of the electronic component 68 can be highly accurately positioned to the holes of the circuit board.

Figure 9:
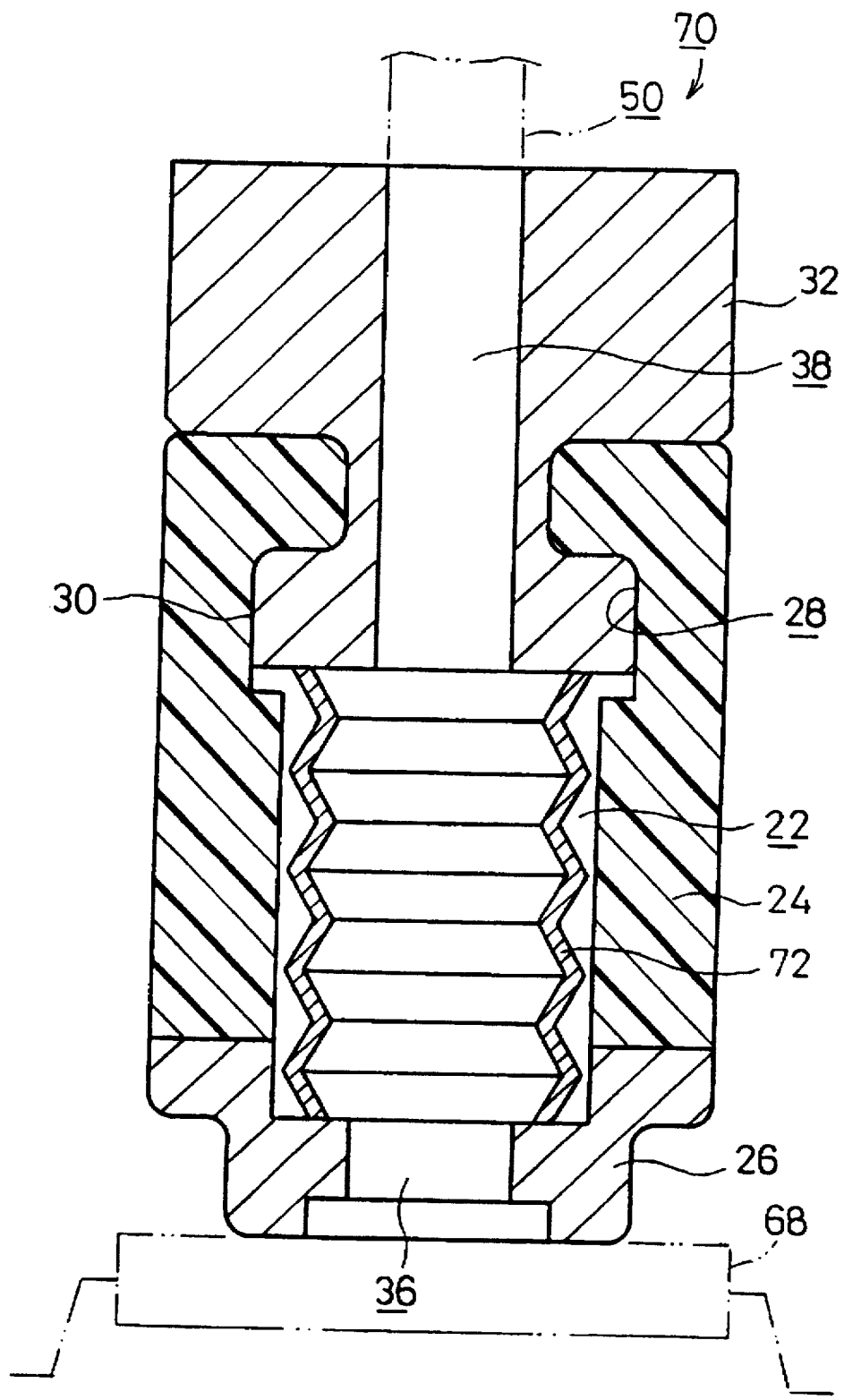
FIG. 9 is a vertical cross-sectional view of a suction pad according to a second embodiment of the present invention.

A suction pad 70 according to a second embodiment of the present invention is shown in FIG. 9. Incidentally, in the following embodiments, the same elements as those of the first embodiment shown in FIG. 7 are designated by the same reference numerals, detailed explanation of which is omitted.

In the suction pad 70, an elastic metallic bellows 72 is arranged in the hole 22 in the main body 24 as a replacement for the spring member 34 shown in FIG. 7. In this arrangement, static electricity borne by the electronic component 68 is discharged to the ground through the metallic workpiece attracting portion 26, the bellows 72 and the adapter 32 in contact with each other.

Figure 10:
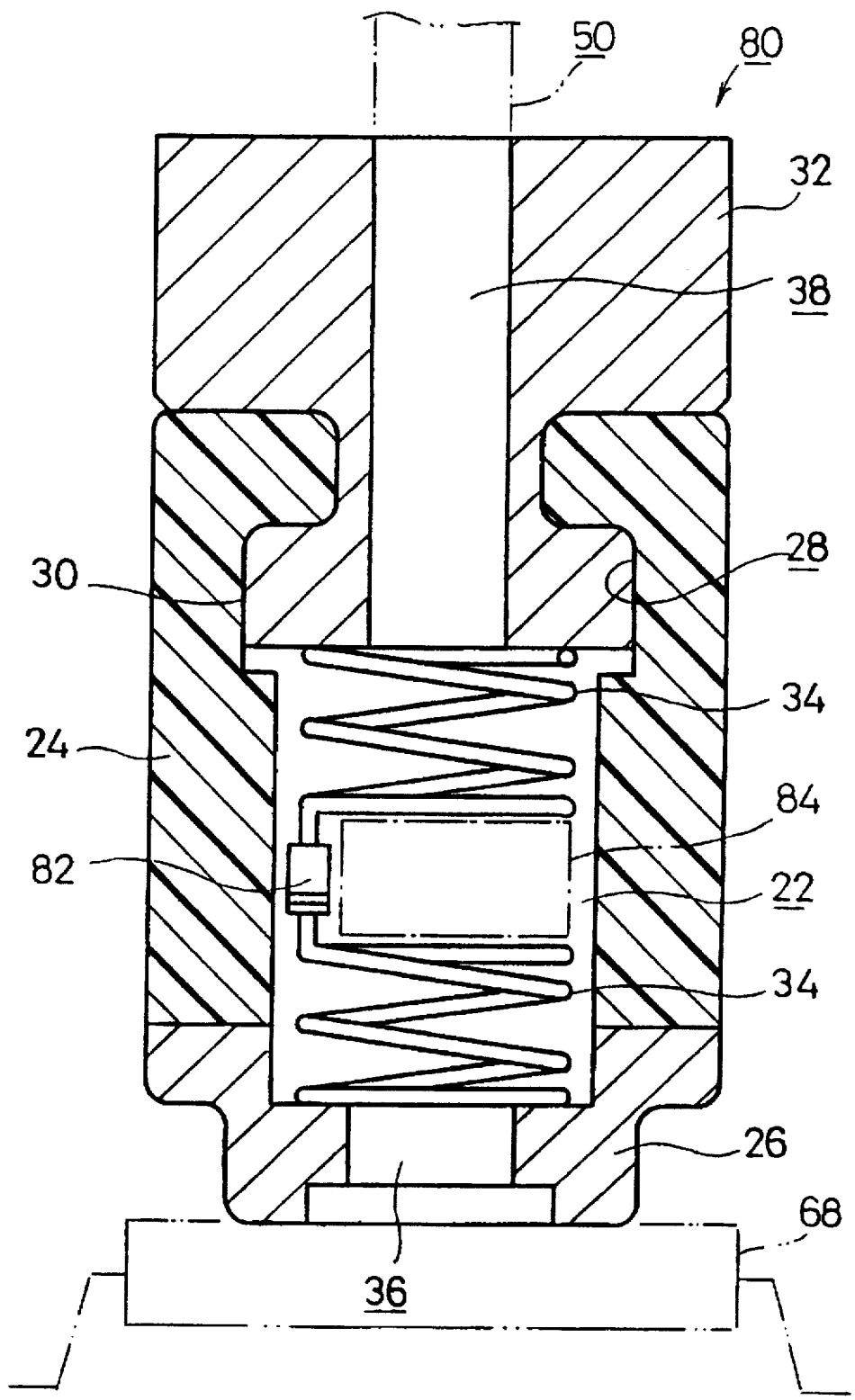
FIG. 10 is a vertical cross-sectional view of a suction pad according to a third embodiment of the present invention.

A suction pad 80 according to a third embodiment of the present invention is shown in FIG. 10.

The suction pad 80 is different in that a rectifier 82 is inserted between halves of the spring member 34 shown in FIG. 7. In this arrangement, the rectifier 82 prevents the static electricity to be discharged to the ground from flowing back to the electronic component 68. Incidentally, it is preferable that a spacer 84 comprising an insulator such as a synthetic resin is interposed between the halves of spring member 34.

Figure 11:
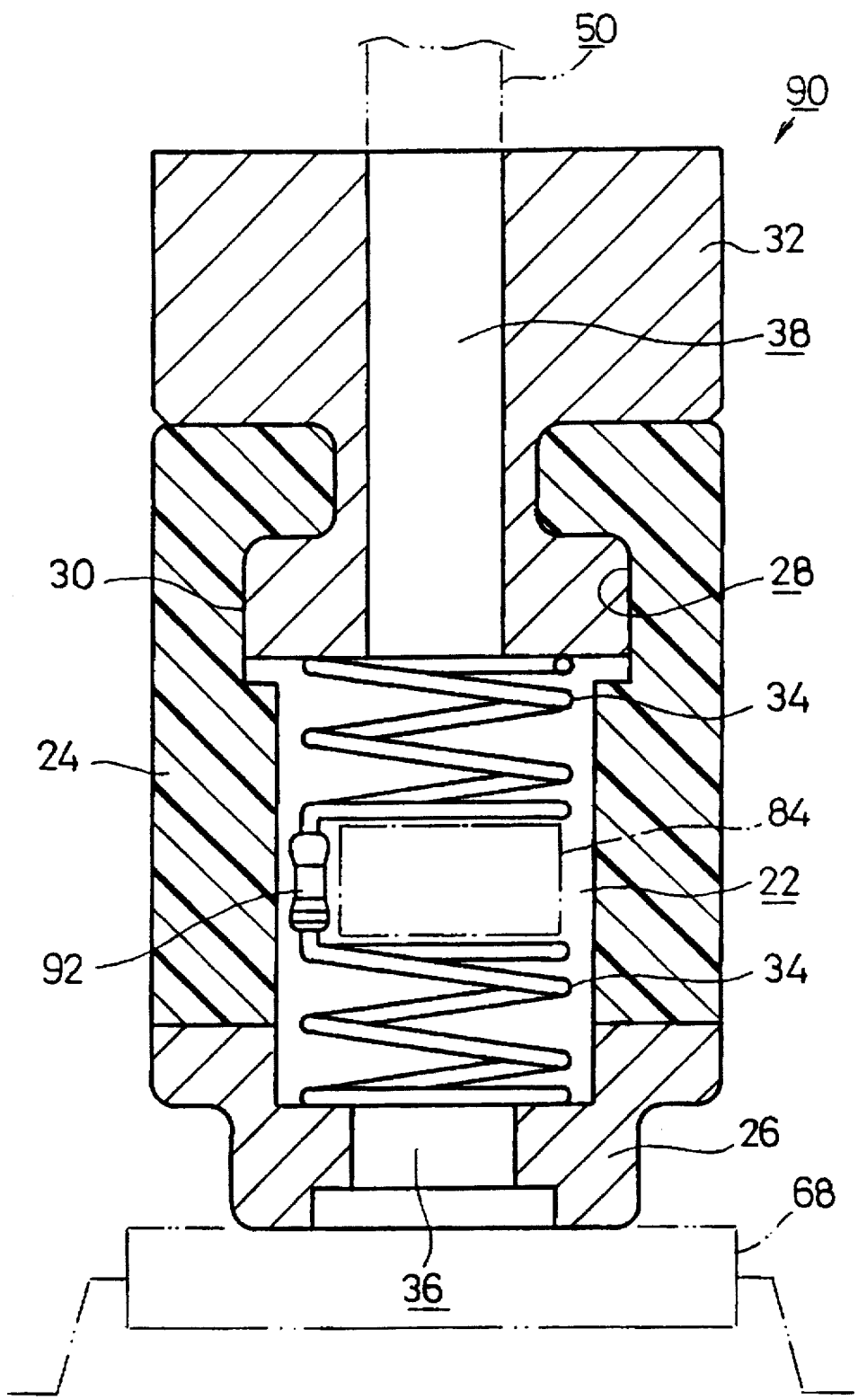
FIG. 11 is a vertical cross-sectional view of a suction pad according to a fourth embodiment of the present invention.

A suction pad 90 according to a fourth embodiment of the present invention is shown in FIG. 11.

The suction pad 90 is different in that a variable resistor 92 is inserted between halves of the spring member 34 shown in FIG. 7. In this arrangement, the variable resistor 92 controls the rate of discharging the static electricity to the ground, to allow a safe discharge of the static electricity to guard the performance of the electronic component 68 from being damaged.

Figure 12:
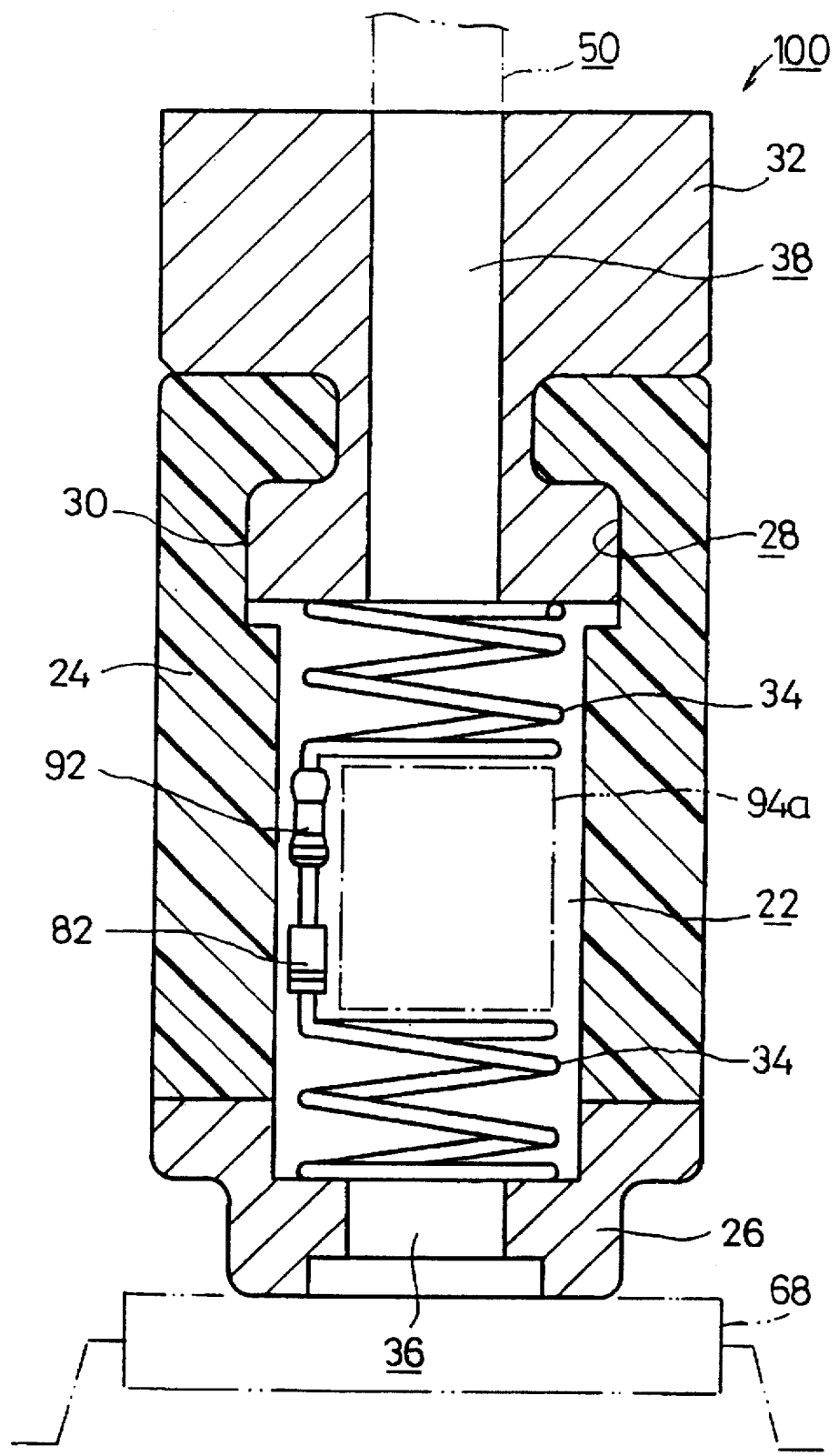
FIG. 12 is a vertical cross-sectional view of a suction pad according to a fifth embodiment of the present invention.

A suction pad 100 according to a fifth embodiment of the present invention is shown in FIG. 12.

The suction pad 100 is a combination of the second and the third embodiments, in which the rectifier 82 and the variable resistor 92 connected in series are inserted between halves of the spring member 34 shown in FIG. 7. Functions of the rectifier 82 and the variable resistor 92 are the same as those described above. A reference numeral 94a is a spacer.

Figure 13:
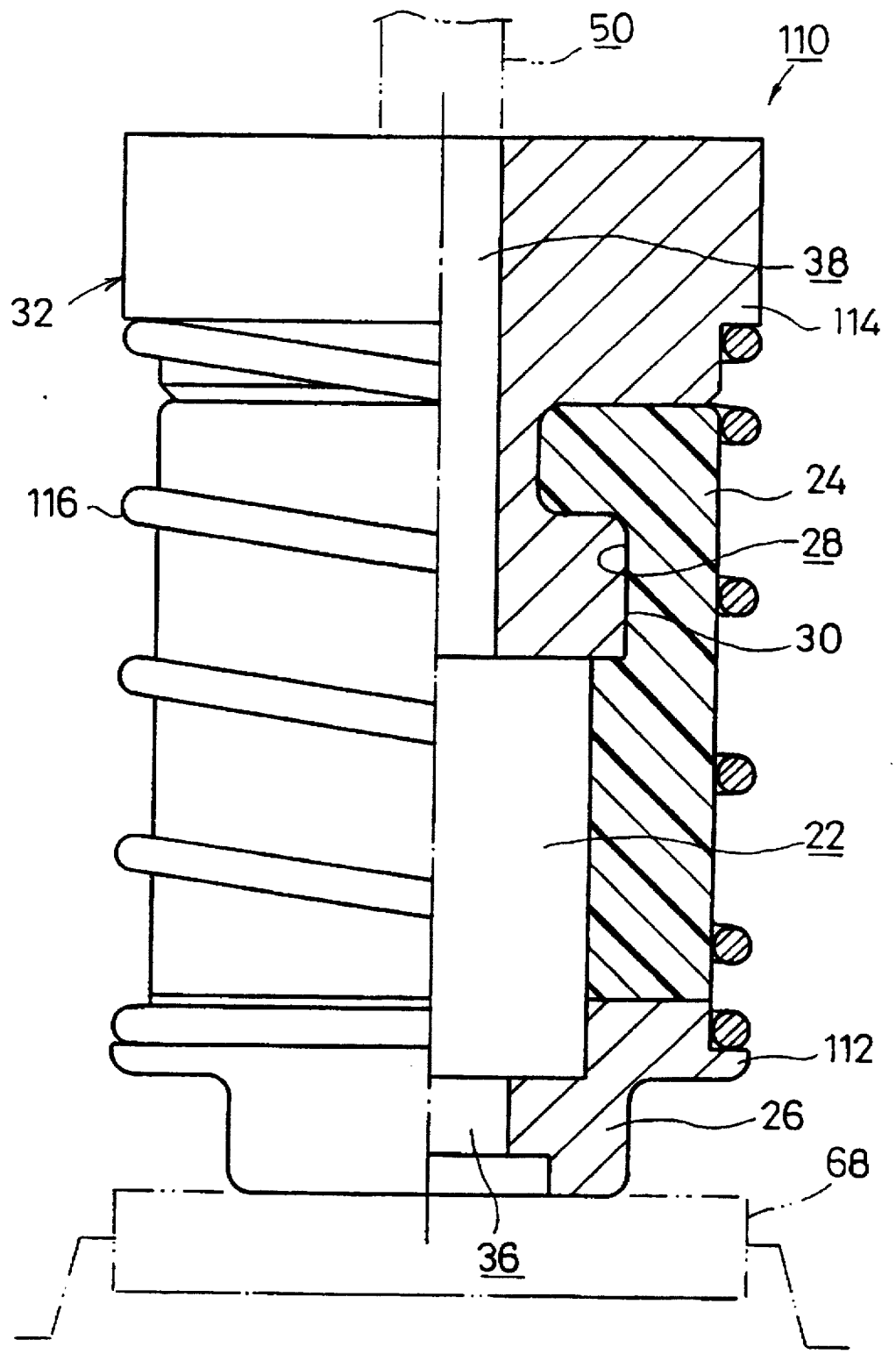
FIG. 13 is a partial vertical cross-sectional view of a suction pad according to a sixth embodiment of the present invention.

A suction pad 110 according to a sixth embodiment of the present invention is shown in FIG. 13.

The suction pad 110 is different from the suction pad 20 shown in FIG. 7 in that flanges 112, 114 are respectively formed at the workpiece attracting section 26 and the adapter 32, and a spring member 116 is provided along the outer surface of the main body 24, and is stopped by the flange portions 112, 114. In this arrangement, as the spring member 116 is provided along the outer surface of the main body 24, it is easy to assemble the suction pad 110.

Figure 14:
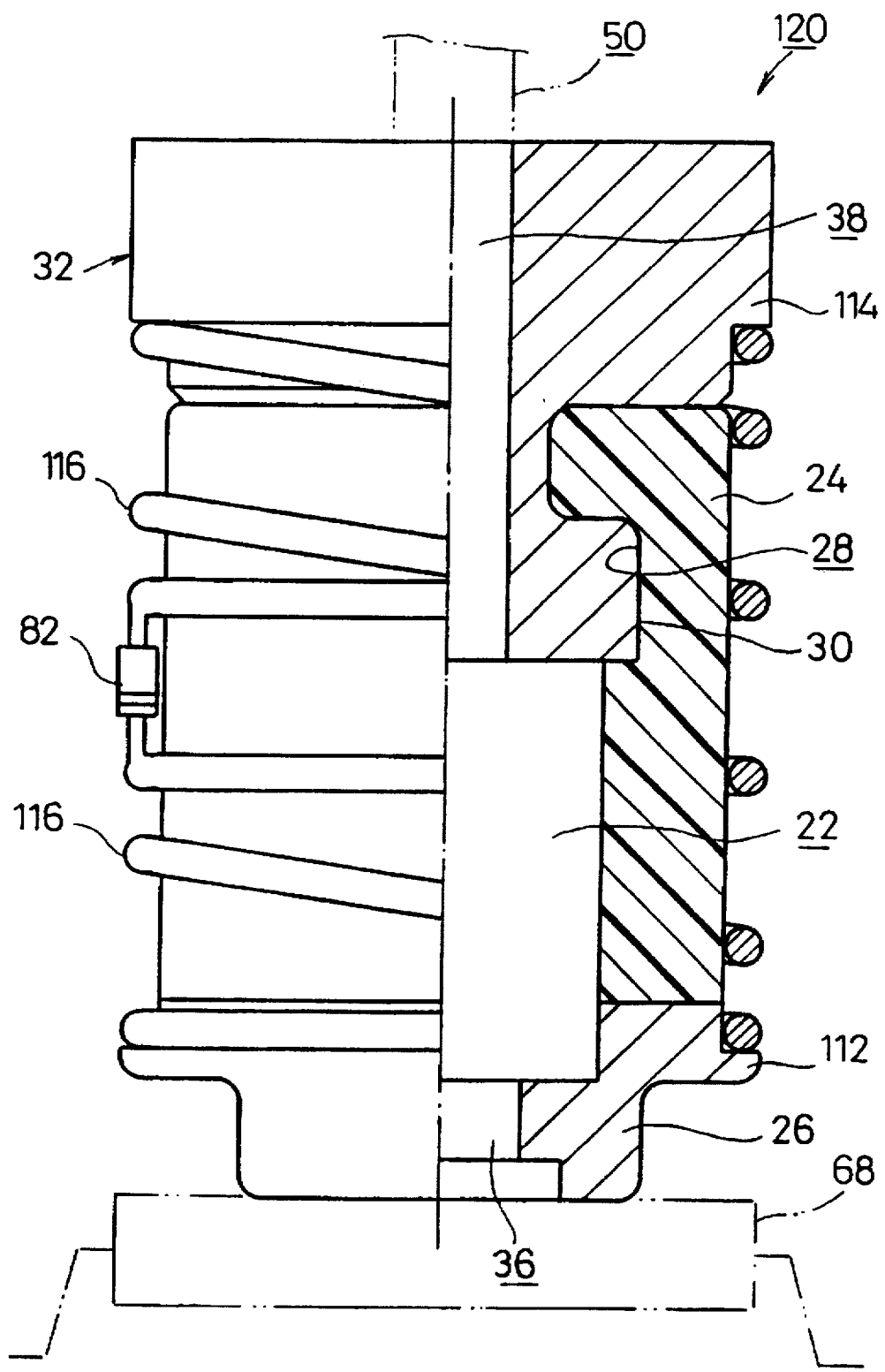
FIG. 14 is a partial vertical cross-sectional view of a suction pad according to a seventh embodiment of the present invention.

A suction pad 120 according to a seventh embodiment of the present invention is shown in FIG. 14. In this and following embodiments, a spring member 116 and flanges 112, 114 are employed similarly as in the suction pad 110 according to the sixth embodiment, without repeating detailed explanation thereof.

The suction pad 120 is different in that the rectifier 82 is inserted between halves of the spring member 116 of the suction pad 110 shown in FIG. 13.

Figure 15:
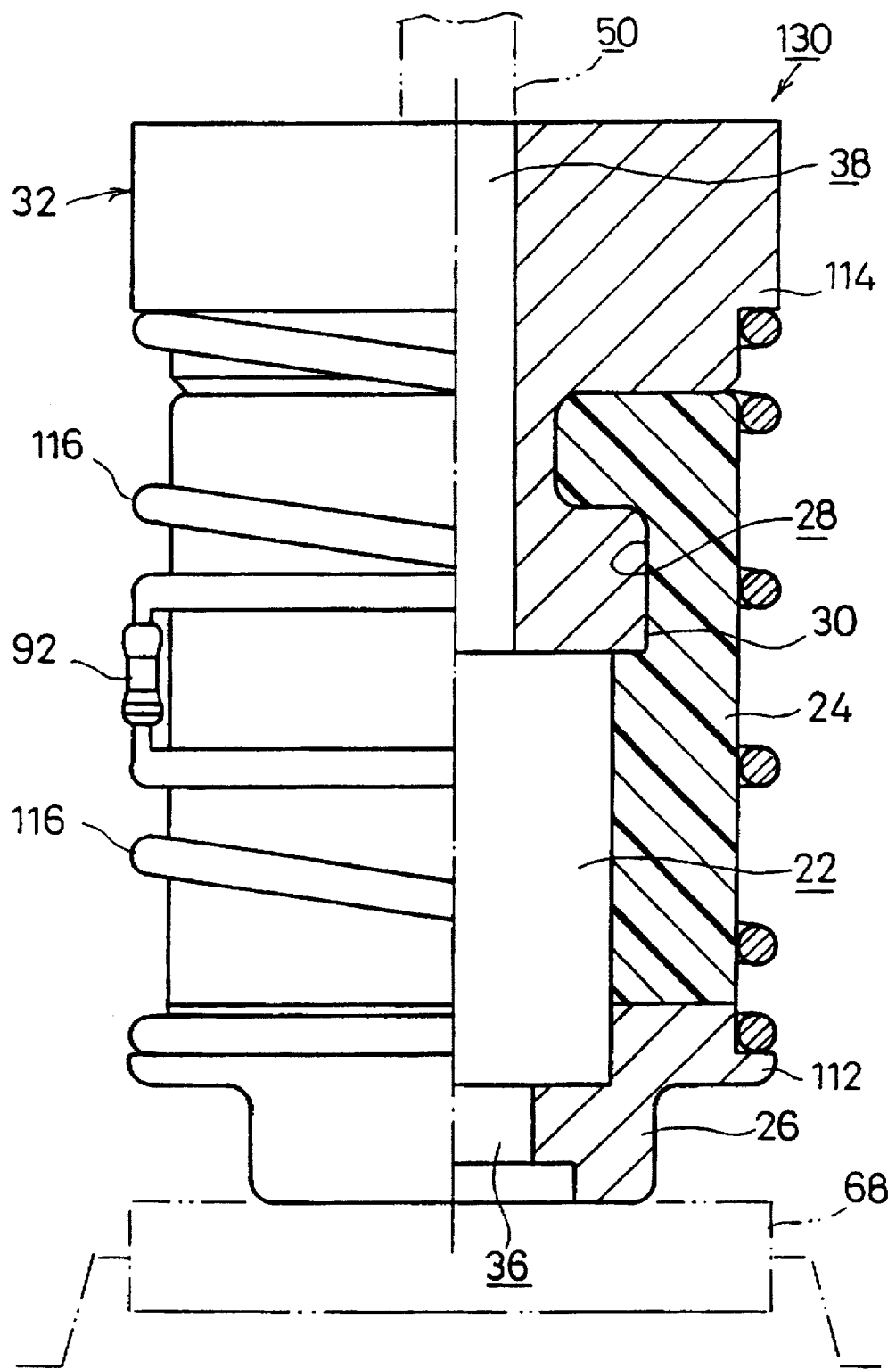
FIG. 15 is a partial vertical cross-sectional view of a suction pad according to an eighth embodiment of the present invention.

A suction pad 130 according to an eighth embodiment of the present invention is shown in FIG. 15.

The suction pad 130 is different in that the variable resistor 92 is inserted between halves of the spring member 116 of the suction pad 110 shown in FIG. 13.

Figure 16:
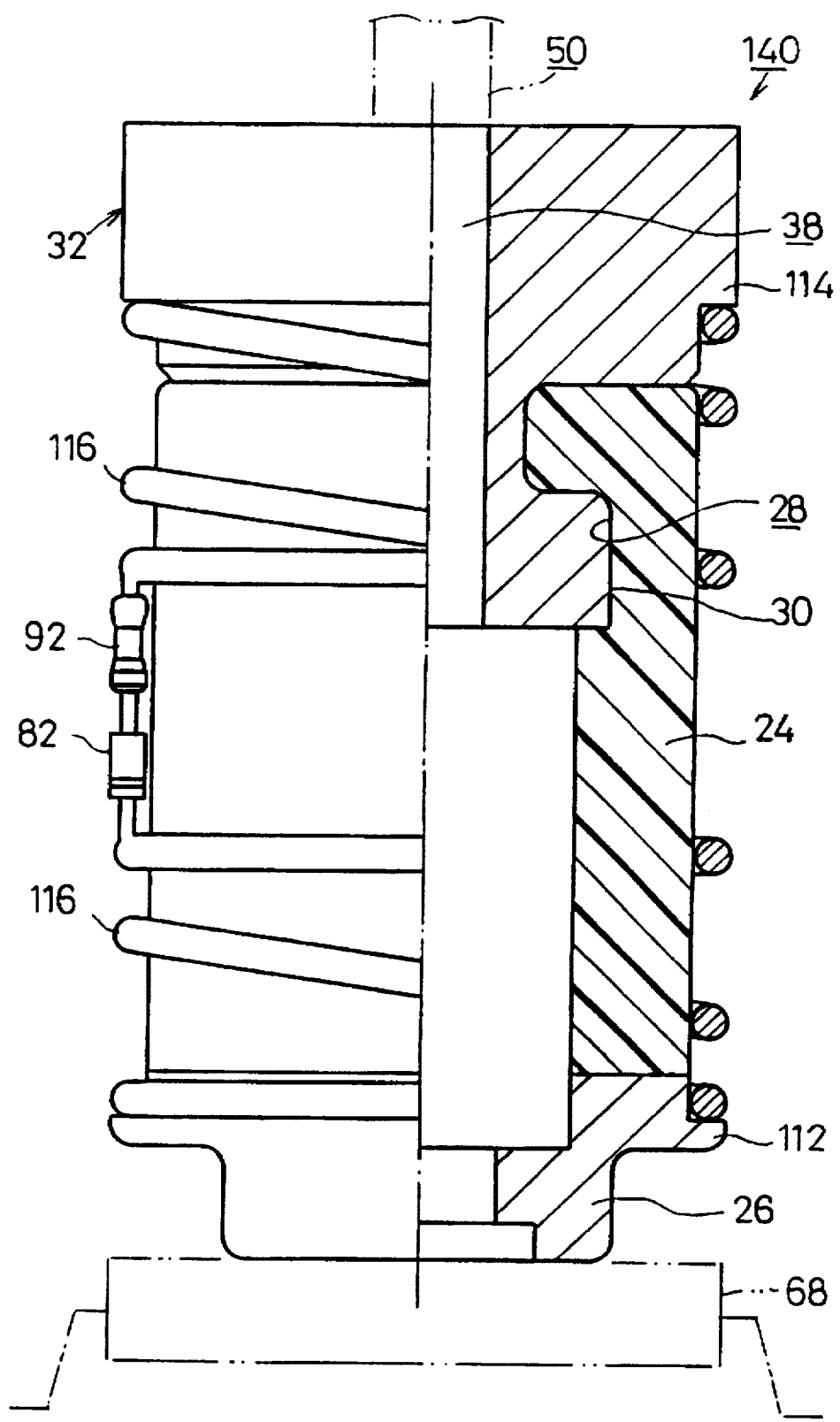
FIG. 16 is a partial vertical cross-sectional view of a suction pad according to a ninth embodiment of the present invention.

A suction pad 140 according to a ninth embodiment of the present invention is shown in FIG. 16.

The suction pad 140 is different in that the rectifier 82 and the variable resistor 92 connected in series are inserted between halves of the spring member 116 of the suction pad 110 shown in FIG. 13.

Figure 17:
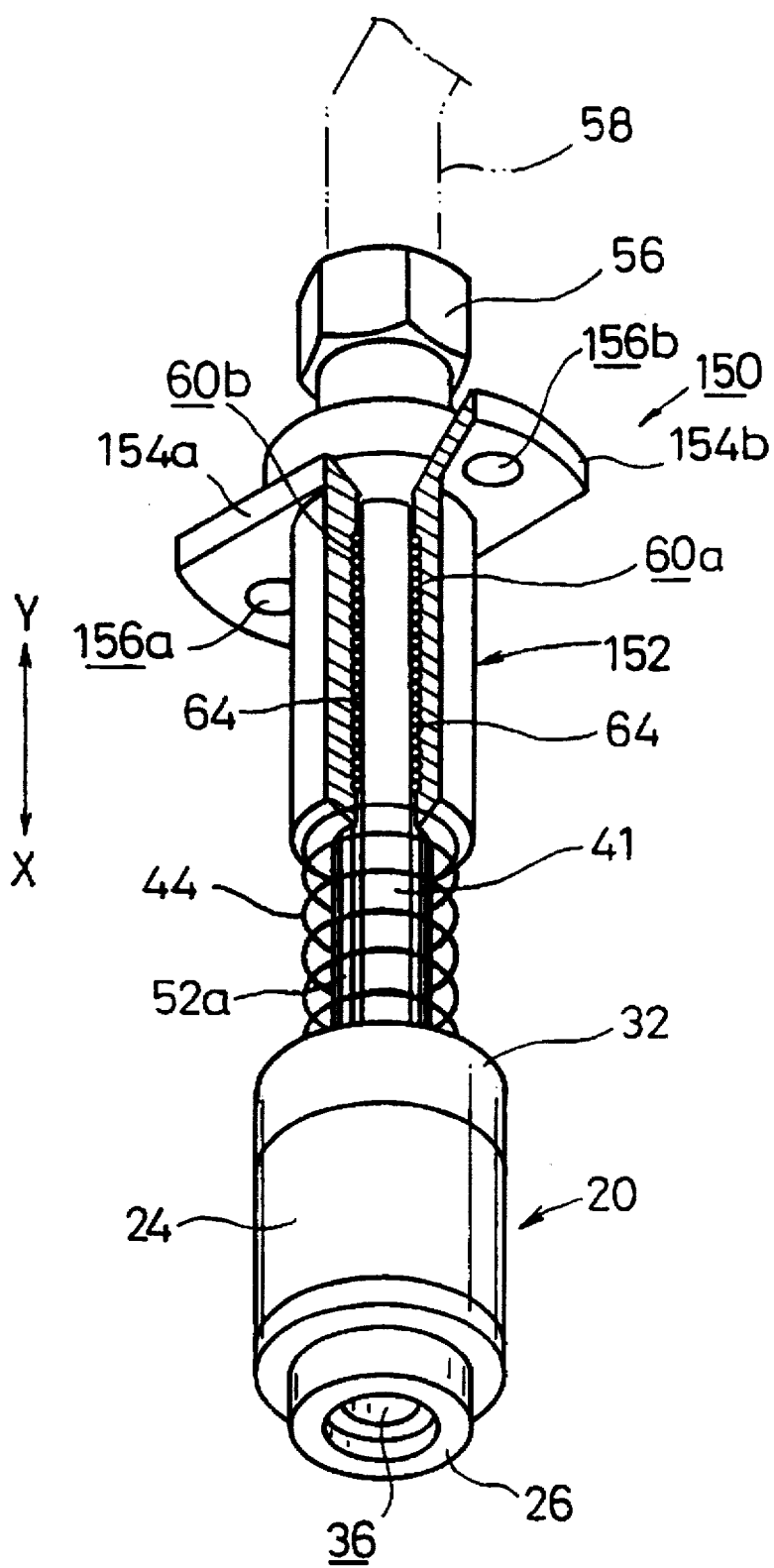
FIG. 17 is a perspective view, partially in cross-section, of a rotation-stop and guide mechanism for suction pads according to the second embodiment of the present invention.

A rotation-stop and guide mechanism 150 for a suction pad as another embodiment of the present invention is shown in FIG. 17. In the following description, the same elements as those of the first embodiment shown in FIG. 6 are designated by the same reference numerals, and detailed explanation of which is omitted.

The rotation-stop and guide mechanism 150 is different from the first embodiment in that no male thread is formed on the outer surface of a cylindrical member 152, and a pair of flanges 154a, 154b expanding radially outwardly are provided at one end of the cylindrical member 152 on the connector 56 side.

The flanges 154a, 154b are defined with bolt holes 156a, 156b, and are fixed to the robot arm by bolts. Different from the rotation-stop and guide mechanism 40 shown in FIG. 6 in which the spacing distance of the suction pad 20 with respect to the workpiece is adjustable by rotating the cylindrical member 42 against the attachment plate 46, the rotation-stop and guide mechanism 150 is suitable to a situation where the spacing distance is set constant beforehand by fixing it to the robot arm by the flanges 154a, 154b.

Figure 18:
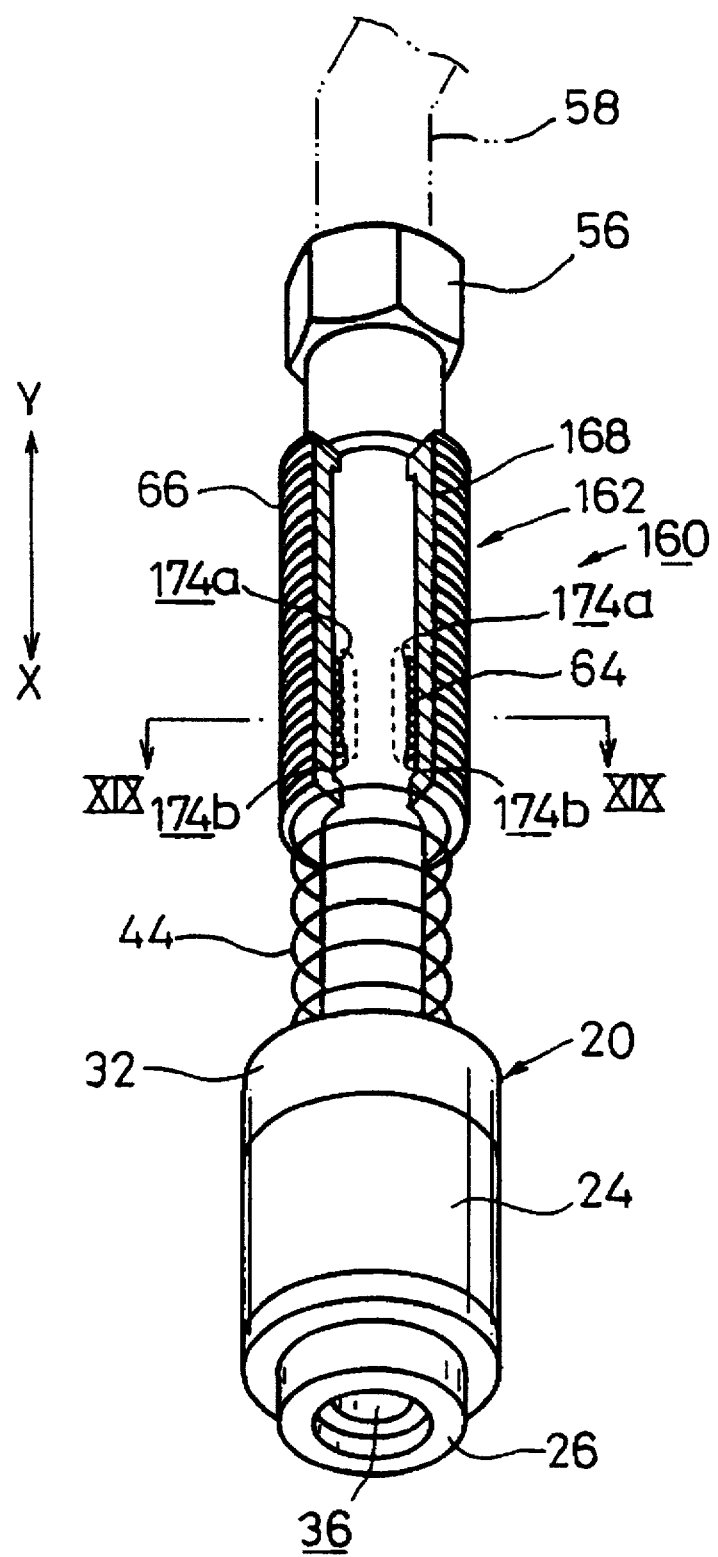
FIG. 18 is a perspective view, partially in cross-section, of a rotation-stop and guide mechanism for suction pads according to the third embodiment of the present invention.
Figure 19:
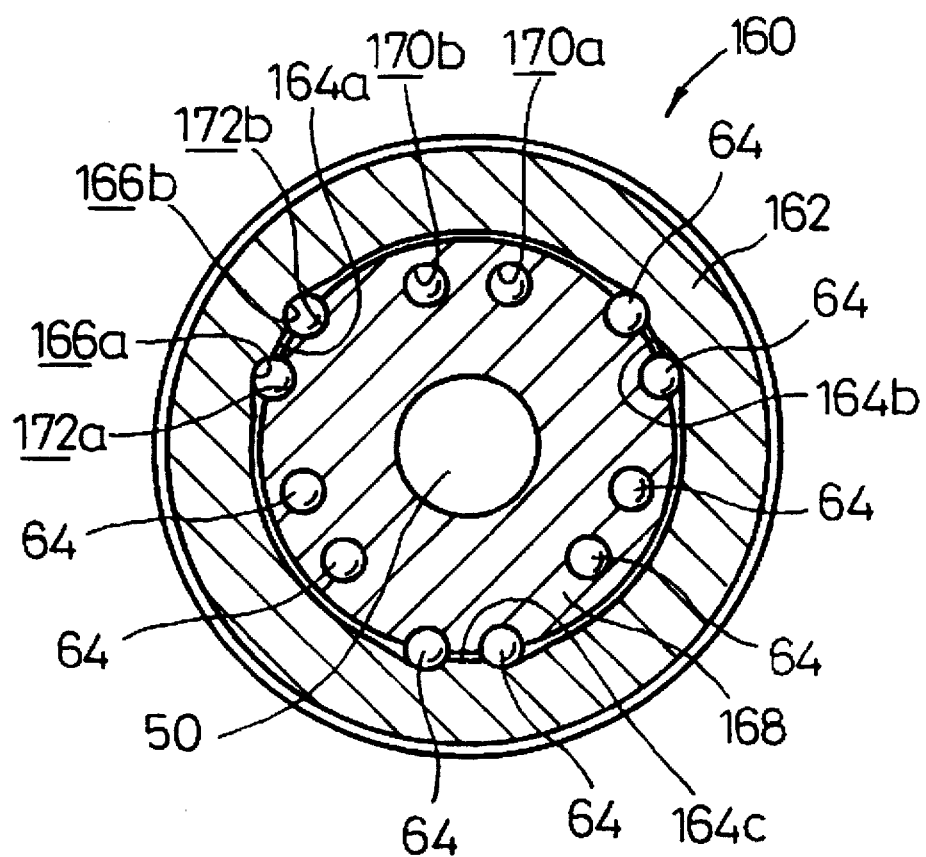
FIG. 19 is a lateral cross-sectional view taken along a line XIX—XIX shown in FIG. 18.

A rotation-stop and guide mechanism 160 for a suction pad according to another embodiment of the present invention is shown in FIG. 18 and FIG. 19.

The rotation-stop and guide mechanism 160 comprising a cylindrical member 162 and a shaft 168 is different from the rotation-stop and guide mechanism 40 in the following points.

Namely, on the inner wall surface of the cylindrical member 162, three raised lines 164a–164c are formed by defining three pairs of grooves 166a, 166b; 166a, 166b; 166a, 166b along the longitudinal axis of the cylindrical member 162, each pair angularly spaced by a predetermined angle and respectively having a ship-bottom shape cross-section disposed symmetrically across each raised line. In the shaft 168, three pairs of elongated holes 170a, 170b; 170a, 170b; 170a, 170b and three pairs of groove lines 172a, 172b; 172a, 172b; 172a, 172b are defined along the axial direction, each pair opposing to the pair of grooves 166a, 166b on the inner wall surface of the cylindrical member 162. The grooves 166a, 166b; 166a, 166b; 166a, 166b and the elongated holes 170a, 170b; 170a, 170b; 170a, 170b are connected at their respective ends to form closed loops respectively, in which a plurality of balls 64 circulate (see FIG. 18), similarly in the first embodiment.

Figure 20:
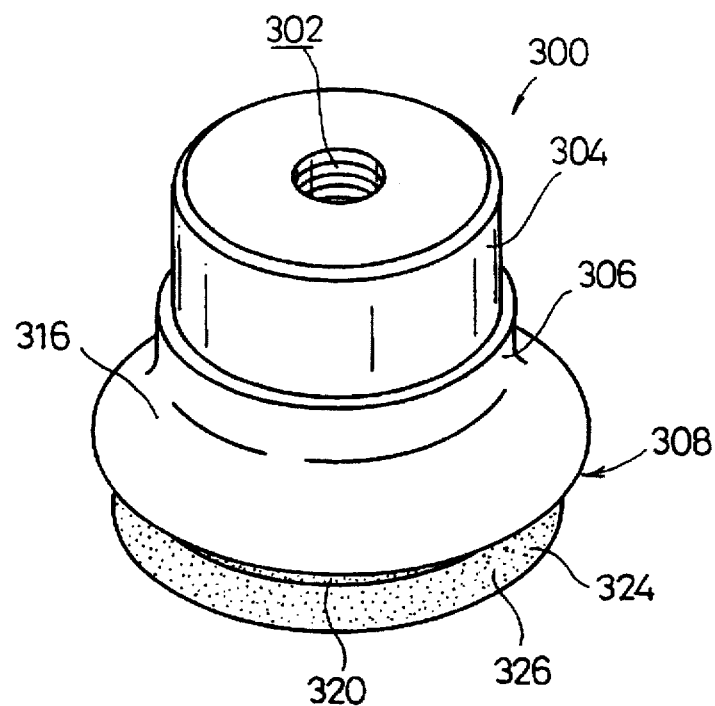
FIG. 20 is a perspective view of a suction pad for preventing abrasion of a skirt according to an embodiment of the present invention.
Figure 21:
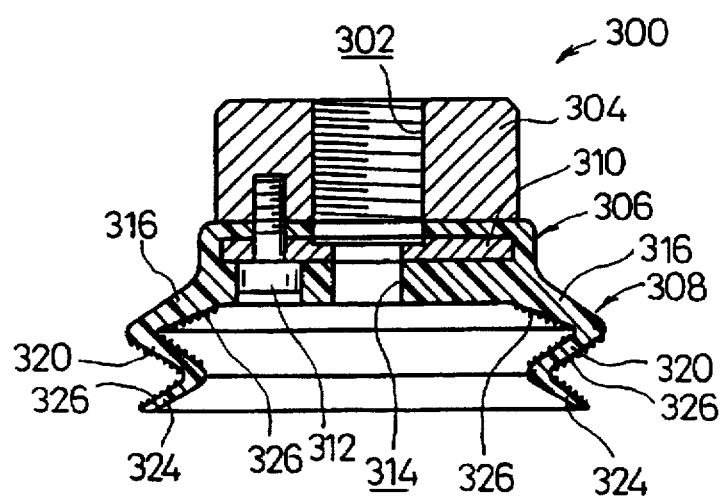
FIG. 21 is a vertical cross-sectional view of the suction pad shown in FIG. 20.

A skirted suction pad 300 according to an embodiment of the present invention is shown in FIGS. 20 and 21.

This suction pad 300 comprises an adapter 304 in which a passage 302 to communicate with a vacuum source (not shown) is defined; a base 306 to be mounted to the adapter 304; and a bellows skirt 308 formed integrally with the base 306. A doughnut-shaped fixing plate 310 is embedded in the base 306, and the base 306 is mounted to the lower surface of the adapter 304 with a plurality of bolts 312 screwed into the adapter 304 through bolt holes defined in the fixing plate 310. A hole 314 for communicating with the passage 302 of the adapter 304 is defined through the base 306 at its approximate center.

The bellows skirt 308 comprises first, second and third bellows sections 316, 320, 324, as shown in FIG. 21, whose wall thickness gradually becomes thinner from the first to third bellows section.

Fine irregularities 326 are formed on the inner wall surface of the first bellows section 316, both inner and outer wall surfaces of the second bellows section 320, and the outer wall surface of the third bellows section 324. The irregularities 326 are formed, for example, by providing irregularities on the surface of a mold for molding the bellows skirt 308, by means of a wrinkle forming process, a shot blast process or the like. The wrinkle forming process refers to a procedure in which acid is applied to the surface of the mold at specified locations to form irregularities there.

The shot blast process refers to a procedure in which sand or the like is blasted with compressed air against the surface of the mold so as to form irregularities there.

In operation of the suction pad 300 constituted as described above, the passage 302 of the adapter 304 is connected with the vacuum source by a tube or the like. By the motion of an robot arm, the suction pad 300 held by the robot arm is brought to the location where a workpiece is. The terminating end of the bellows skirt 308 contacts with the surface of the workpiece. The workpiece is attracted while the bellows skirt 308 is contracted with the bellows surfaces brought to contact with each other. When the workpiece is released from attraction, the bellows skirt 308 surely restores its original shape, without adhesion of the bellows surfaces to each other, owing to the fine irregularities 326 formed thereon.

Therefore, it becomes possible to continuously repeat to transfer the workpiece without interruption, and to achieve an efficient operation. Further, abrasion of the bellows skirt as experienced in a conventional skirted suction pad is prevented, and the durability of the suction pad is improved.

What is claimed is:

1. A rotation-stop and guide mechanism for a suction pad, comprising:

a shaft, coupled at one end thereof to a suction pad and coupled at the other end thereof to a tube for communicating with a vacuum source, having a through hole defined therein for allowing communication between said suction pad and said tube;

a cylindrical member externally fitted over said shaft and displaceable along said shaft;

a resilient member interposed between said suction pad and the cylindrical member; and rotation-stop means for stopping rotation of said cylindrical member with respect to said shaft, comprising
     raised lines provided on either the outer wall surface of said shaft or the inner wall surface of the cylinder member, extending along the axis of said shaft, angularly spaced by a predetermined angle, and
     rolling members arranged between said cylindrical member and said shaft, said rolling members working in cooperation with said raised lines to stop the rotation of said cylindrical member against said shaft, and rolling upon linear displacement of said cylindrical member along said shaft.

2. The mechanism according to claim 1 wherein said rolling members comprise a plurality of balls, said balls being held between a groove having an approximately semicircular cross-section defined in one of the outer wall surface of said shaft or the inner wall surface of the cylindrical member, and another groove opposing said groove and having a ship-bottom shape cross-section, defined adjacent to said raised line in the other of the outer wall surface of said shaft or the inner wall surface of the cylindrical member.

3. The mechanism according to claim 2 wherein the plurality of balls roll to circulate through an elongated hole communicating with a gap defined by said opposing grooves.

4. The mechanism according to claim 1 further comprising an attachment plate, wherein said attachment plate is engaged with said cylindrical member through a male thread formed on the outer wall surface of the cylindrical member.

5. The mechanism according to claim 1 further comprising flanges, wherein said flanges are provided at one end of said cylindrical member and defined with bolt holes.

* * * * *